United States Patent [19]
Gage et al.

[11] Patent Number: 6,013,004
[45] Date of Patent: Jan. 11, 2000

[54] PARALLEL-AXIS GEAR DIFFERENTIAL WITH PINION MOUNTED BRAKE SHOES

[75] Inventors: Garrett W. Gage, Goodrich; James R. Zinke, II, Oxford, both of Mich.

[73] Assignee: American Axle & Manufacturing, Inc., Detroit, Mich.

[21] Appl. No.: 09/251,319

[22] Filed: Feb. 17, 1999

[51] Int. Cl.[7] ............................. F16H 48/10; F16H 48/22
[52] U.S. Cl. ........................................... 475/249; 475/252
[58] Field of Search ...................................... 475/249, 252

[56] References Cited

U.S. PATENT DOCUMENTS

| | | | |
|---|---|---|---|
| 3,375,736 | 4/1968 | Saari | 475/249 |
| 5,221,238 | 6/1993 | Bawks et al. | 475/226 |
| 5,415,599 | 5/1995 | Cilano | 475/252 |
| 5,433,673 | 7/1995 | Cilano | 475/252 |
| 5,443,431 | 8/1995 | Cilano | 475/249 |
| 5,462,497 | 10/1995 | Cilano | 475/252 |
| 5,492,510 | 2/1996 | Bowerman | 475/252 |
| 5,632,704 | 5/1997 | Yamazaki et al. | 475/248 |
| 5,658,214 | 8/1997 | Hofstetter et al. | 475/249 |
| 5,711,737 | 1/1998 | Teraoka et al. | 475/162 |
| 5,713,811 | 2/1998 | Fischnaller et al. | 475/252 |
| 5,730,679 | 3/1998 | Ichiki | 475/252 |
| 5,733,216 | 3/1998 | Bowerman | 475/252 |
| 5,785,624 | 7/1998 | Mayr | 475/252 |

*Primary Examiner*—Sherry L. Estremsky
*Attorney, Agent, or Firm*—Harness, Dickey & Pierce, P.L.C.

[57] ABSTRACT

Parallel-axis gear differentials include a housing rotatable about a common axis of a pair of output shafts, and a planetary gearset mounted in the housing for interconnecting the output shafts. The gearset includes a pair of side gears positioned within the housing and fixed for rotation with the output shafts, and two or more pairs of meshed pinions journally mounted in gear pockets formed in the housing, with each pinion having a gear segment meshed with a gear segment of the other pinion and with one of the side gears. An anti-tipping mechanism includes brake shoes that are journalled on stub shaft segments of the pinions. Each brake shoe has a first support surface which mates with the outer diameter surface of a corresponding side gear, a second support surface which mates with the outer diameter surface of the gear segment on the adjacent meshed pinion, and a third support surface which mates with the wall surface of the gear pocket. As an optional feature, the interface between the shaft segment of the pinion and the brake shoe can be modified to include a cone clutch for generating supplemental braking forces in response to axial movement therebetween.

15 Claims, 4 Drawing Sheets

PARALLEL-AXIS GEAR DIFFERENTIAL WITH PINION MOUNTED BRAKE SHOES

FIELD OF THE INVENTION

This invention relates generally to differentials for use in automotive drivelines and, more particularly, to a parallel-axis gear differential having a planetary gearset equipped with brake shoes for improving gear alignment and increasing torque biasing.

BACKGROUND OF THE INVENTION

Parallel-axis gear differentials of the type used in automotive drivelines generally include a housing rotatively driven by the vehicle powertrain and a gearset supported in the housing which interconnects a pair of coaxial output shafts. The gearset typically includes a pair of side gears fixed to end portions of the output shafts and meshed pair sets of pinions respectively meshed with the side gears. The pinions are rotatably supported in longitudinal gear pockets formed in the housing. The gear pockets are circumferentially arranged to support the meshed sets of pinions for rotation about pinion axes that are parallel to the rotary axis shared by the side gears and the housing. A representative example of such a parallel-axis gear differential is shown in U.S. Pat. No. 5,711,737.

As is known, during high torque conditions the gear loading may cause the ends of the pinions to move radially (i.e., "end tipping") which, in turn, causes the pinions to aggressively engage the bearing wall surfaces of the gear pockets, thereby potentially degrading the durability of the differential. In addition, such tipping often results in misalignment of the gear contact surfaces which can detrimentally impact tooth life and the efficiency of the gearset. In an effort to improve pinion alignment stability in parallel-axis gear differentials, various alternative support structures have been proposed. For example, U.S. Pat. No. 5,658,214 discloses the use of bearing plates to support the opposite ends of the intermeshed pinion set. In an alternative arrangement, U.S. Pat. No. 5,785,624 discloses the use of a supporting disc at one end of each pinion which bears against a journal post of the other pinion to support the ends of the meshed pinion set. Furthermore, U.S. Pat. No. 5,730,679 teaches of journalling an end shaft portion of each pinion in a support hole formed in the end walls of the housing for minimizing pinion tipping.

In addition to the pinion support arrangements described above, some parallel-axis gear differentials are designed to permit limited movement of the pinions for increasing frictional resistance to speed differentiation. For example, U.S. Pat. Nos. 5,415,599, 5,433,673 and 5,462,497 each disclose a parallel-axis gear differential equipped with a movable gear mounting structure (i.e., pivotable toggles or pedestals) having bearing surfaces which act on the outer diameter surface of adjacent pinions to apply a frictional braking force thereon. In a further modified form, U.S. Pat. No. 5,443,431 shows a similar movable gear mounting structure mounted in a casing portion of the housing with friction wedges supported by the casing portion between adjacent meshed pairs of pinions for further increasing frictional resistance to differentiation. Finally, U.S. Pat. No. 3,375,736 teaches of a limited slip differential having support blocks aligned axially with the pinions. A coil spring is disposed therebetween for biasing the support blocks and pinions in opposite axial directions and into contact with a pair of laterally-spaced friction plates which, in turn, are fixed for rotation with the side gears, thereby providing a spring-biased limited slip function. Consequently, there remains a need in the differential art for a parallel-axis differential with an anti-tipping feature that improves pinion alignment stability in a simple and cost-effective manner.

SUMMARY OF THE INVENTION

Thus, it is an object of the present invention to provide a parallel-axis differential having a planetary gearset equipped with anti-tipping mechanism for supporting the pinions along their entire length.

As a related object of the present invention, the anti-tipping mechanism is also operable to apply a frictional braking load on components of the gearset for increasing frictional resistance to speed differentiation.

Accordingly, the present invention can be practiced as an improvement to parallel-axis gear differentials that include the conventional features of a housing rotatable about a common axis of a pair of output shafts, and a planetary gearset mounted in the housing for interconnecting the output shafts. The gearset includes a pair of side gears positioned within the housing and fixed for rotation with the output shafts, and two or more pairs of meshed pinions journally mounted in gear pockets formed in the housing, with each pinion having a gear segment meshed with a gear segment of the other pinion and with one of the side gears. The anti-tipping mechanism includes brake shoes that are journalled on integral stub shaft segments of the pinions. Each brake shoe has a first support surface which mates with the outer diameter surface of a corresponding side gear, a second support surface which mates with the outer diameter surface of the gear segment on the adjacent meshed pinion, and a third support surface which mates with the wall surface of the gear pocket. Thus, the brake shoes support the typically unsupported stub shaft segments of the pinions which, in conjunction with the length of meshed contact provided by the gear segments, acts to effectively support the pinions along their entire length.

As an optional feature, the interface between the stub shaft segment of the pinion and the brake shoe can be modified to include a cone clutch for generating supplemental braking forces in response to axial movement therebetween to further assist in increasing frictional resistance to differentiation.

Further areas of applicability of the present invention will become apparent from the detailed description provided hereinafter it should be understood, however, that the detailed description and specific examples, while indicating preferred embodiments of the invention, is intended for purposes of illustration only since various changes and modifications within the scope and spirit of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

With reference to the drawings, a differential 10 for use in motor vehicle driveline applications will be described in sufficient detail to explain its novel and non-obvious structure, function, and features. While differential 10 is shown to be a parallel-axis gear differential of the type used in motor vehicle driveline applications, it is to be understood that the present invention is applicable for use with many variants of differential 10 and, as such, the particular structure shown is intended merely to be exemplary in nature.

Figure 1:
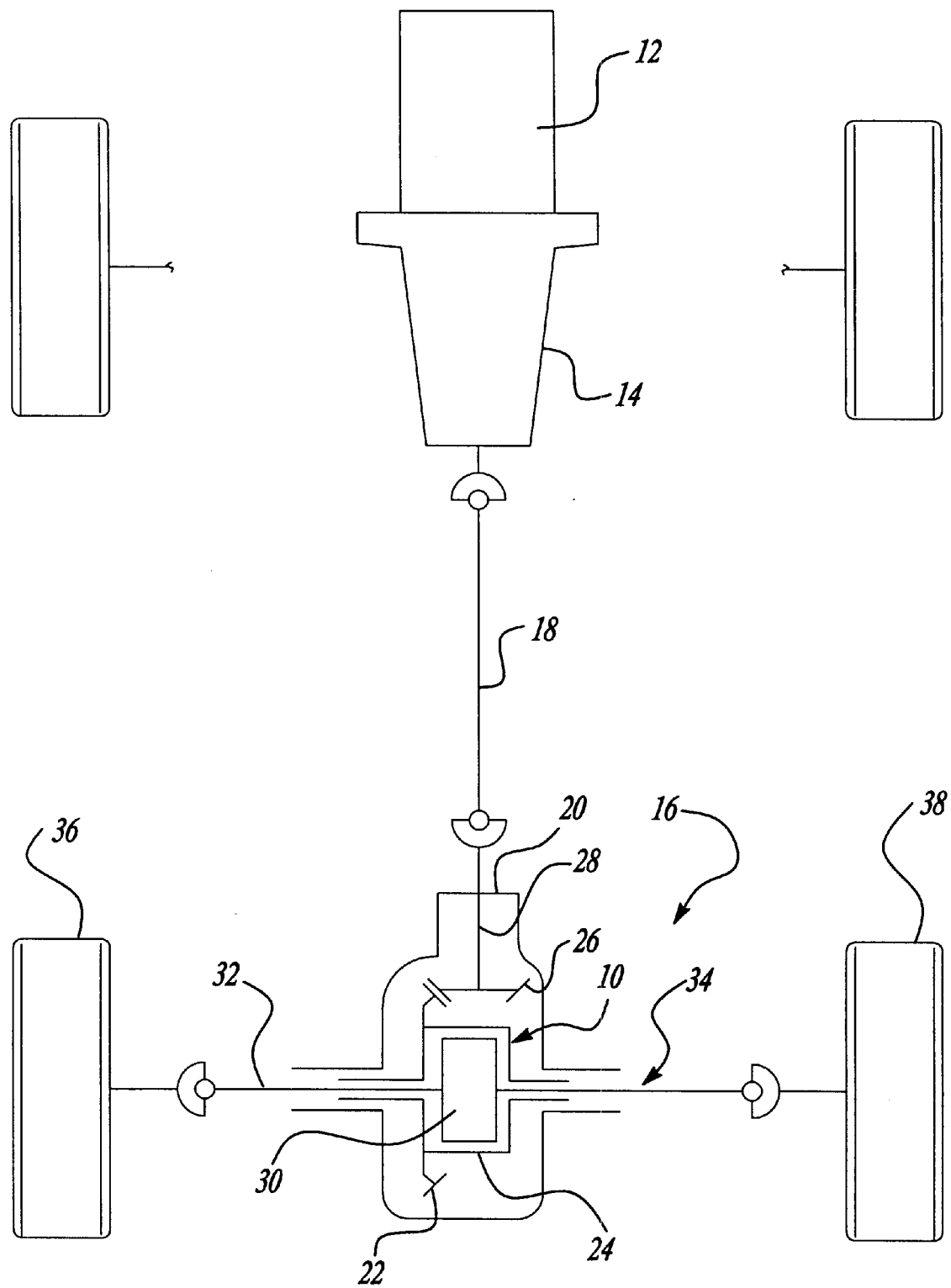
FIG. 1 is a schematic illustration of an exemplary driveline for a motor vehicle equipped with a parallel-axis gear differential of the present invention.

Prior to the description of the components associated with differential 10, an exemplary driveline for a motor vehicle equipped with differential 10 will be explained with particular reference to FIG. 1. Specifically, the motor vehicle driveline is shown to include an engine 12, a transmission 14, a rear axle assembly 16, and a propshaft 18 for supplying drive torque from transmission 14 to rear axle assembly 16. Rear axle assembly 16 includes differential 10 which is rotatably supported within a differential carrier 20. A ring gear 22 is fixed to a housing assembly 24 of differential 10 and is meshed with a drive pinion 26 that is fixed to a pinion shaft 28.

As is conventional, pinion shaft 28 is connected to propshaft 18. As such, engine power is transmitted by transmission 14 through propshaft 18, pinion shaft 28 and ring gear 22 for rotatively driving housing assembly 24. Finally, a planetary gearset 30 is supported within housing assembly 24 for operably interconnecting housing assembly 24 to a pair of axle shafts 32 and 34 which, in turn, are connected to drive wheels 36 and 38, respectively.

With particular reference to FIGS. 2 through 5, a first embodiment of differential 10 is shown in greater detail. In particular, housing assembly 24 is shown to include a drum housing 40 which defines an internal chamber 42 within which gearset 30 is supported. Housing assembly 24 also includes an end cap 44 which is press-fit to a radial flange segment 46 of drum housing 40 and secured thereto such as by fasteners (not shown) extending through aligned mounting apertures 44a and 46a. As is known, ring gear 22 is fixed to radial flange segment 46 to transfer rotary power (i.e., drive torque) to housing assembly 24. Housing assembly 24 also includes tubular axle trunions 50 and 52 which respectively define axially aligned axle openings 54 and 56 that communicate with chamber 42. Axle trunion 50 extends outwardly from the end cap 44 while axle trunion 52 extend outwardly from drum housing 40. Axle openings 54 and 56 are adapted to receive and rotatably support corresponding end segments of axle shafts 32 and 34 for rotation about a central rotary axis, denoted by construction line "A". Likewise, housing assembly 24 of differential 10 is rotatably supported from carrier 20 by suitable axle bearings (not shown) for rotation about rotary axis "A". In addition, annular sockets 58 and 60 are formed in axle openings 54 and 56 adjacent to chamber 42 for rotatably supporting components of gearset 30.

As noted, differential assembly 10 includes a planetary gearset 30 which is operable for transferring drive torque from housing assembly 24 to axle shafts 32 and 34 in a manner facilitating speed differential and torque biasing therebetween. Gearset 30 is mounted in chamber 42 and includes a pair of helical side gears 62 and 64 having internal splines that are adapted to mesh with external splines on corresponding end segments of axle shafts 32 and 34. In addition, side gears 62 and 64 respectively include first axial hubs 62a and 64a which are seated in corresponding annular sockets 58 and 60. Side gears 62 and 64 also respectively include second axial hubs 62b and 64b. Retainers, such as C-clips 66, are retained between shaft grooves 32a, 34a and second axial hubs 62b, 64b for axially positioning and restraining side gears 62 and 64 between end wall surfaces of housing assembly 24 and the end segments of axle shafts 32 and 34. Gearset 30 further includes a spacer block assembly 68 for maintaining side gears 62 and 64 and axle shafts 32 and 34 in axially spaced relation relative to each other while preventing unintentional release of C-clips 66. Once installed, spacer block assembly 68 is free to rotate with respect to either axle shaft 32 and 34 and housing assembly 24.

Figure 2:
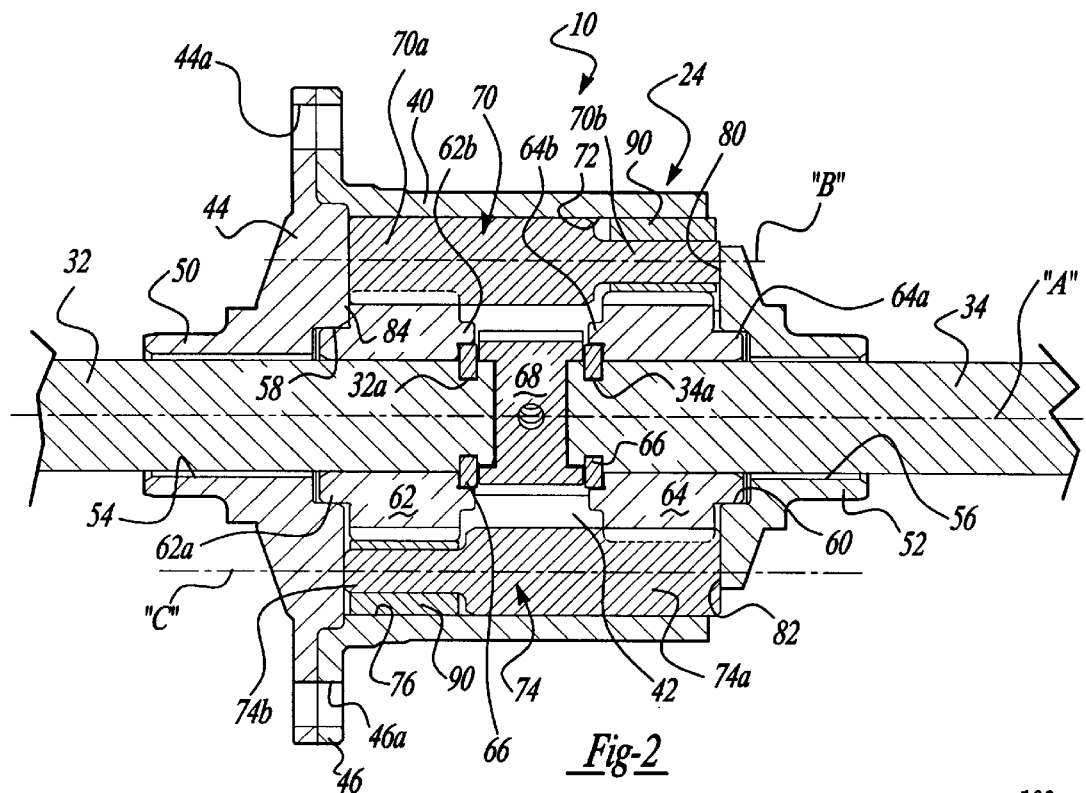
FIG. 2 is a sectional view of the parallel-axis gear differential of the present invention.
Figure 3:
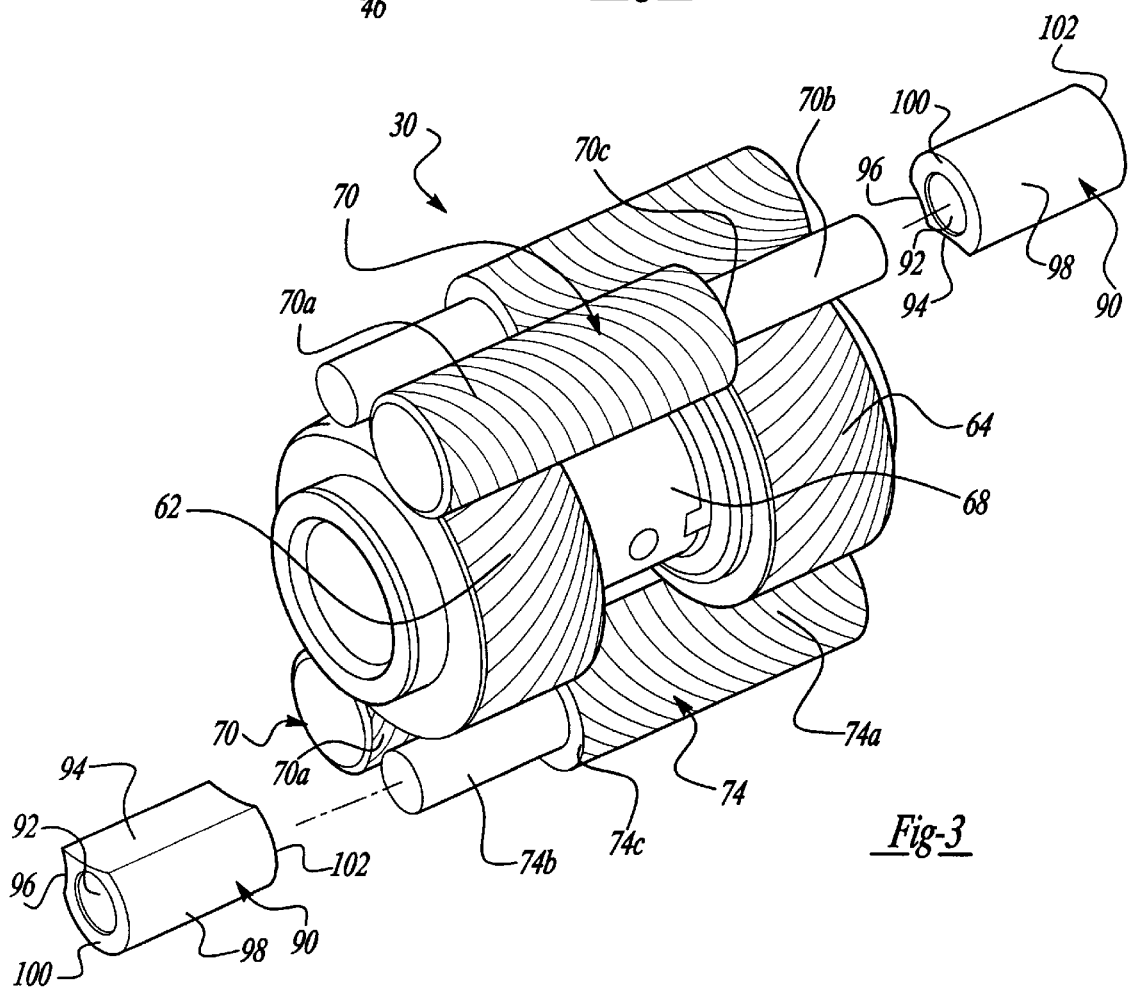
FIG. 3 is an assembled perspective view of the planetary gearset associated with the parallel-axis gear differential shown in FIG. 2.
Figure 4A:
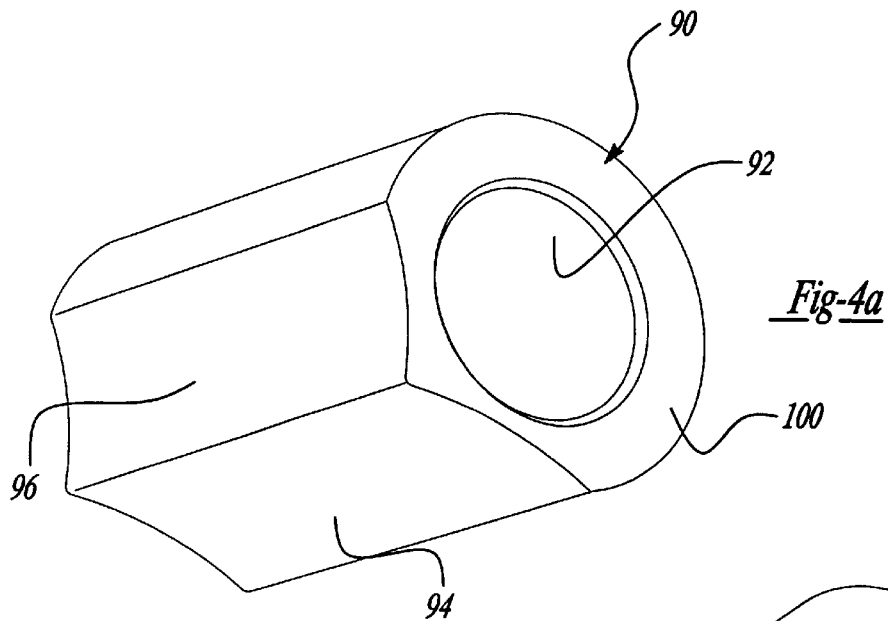
FIGS. 4A and 4B are perspective views of the brake shoe associated with the gearset shown in FIG. 3.
Figure 4B:
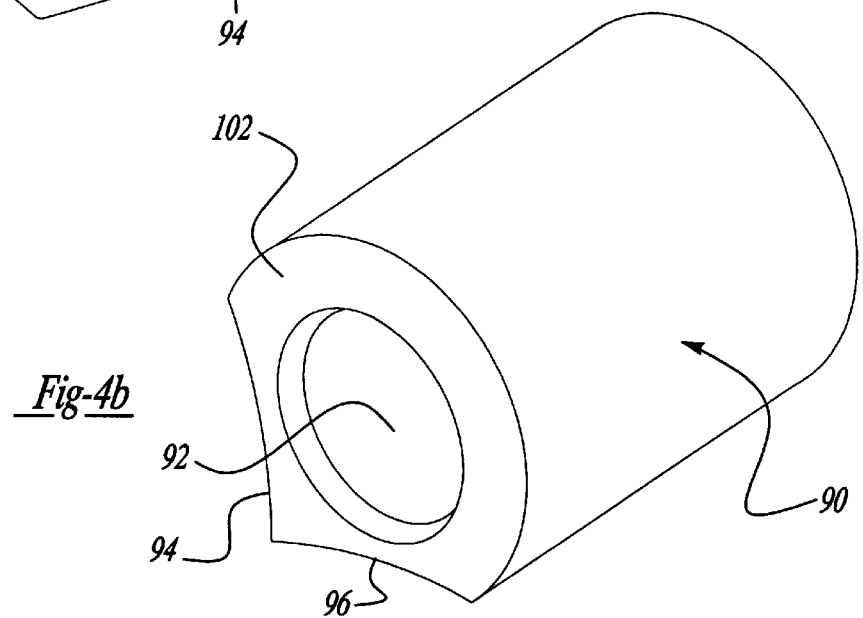
Figure 5:
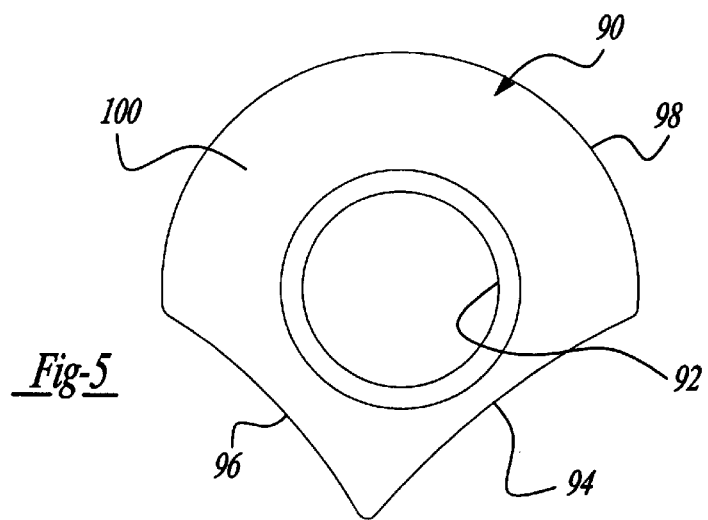
FIG. 5 is an end view of the brake shoes shown in FIG. 4.

As best seen from FIG. 2, planetary gearset 30 also includes a set of first helical pinions 70 journally supported in first gear pockets 72 formed in drum housing 40 and a set of second helical pinions 74 journally supported in second gear pockets 76 formed in drum housing 40. While not limited thereto, differential 10 is shown to include two each of first pinions 70 and second pinions 74 arranged in meshed pairs, referred to as meshed pinion sets. Gear pockets 72 and 76 are elongated, longitudinal, partially cylindrical bores and are formed in paired overlapping sets such that they both communicate with chamber 42. In addition, gear pockets 72 and 76 are equidistant and circumferentially aligned so as to define pinion rotary axes "B" for first pinions 70 and rotary axes "C" for second pinions 74 that are parallel to the rotary axis "A" of housing assembly 24 and axle shafts 32 and 34. First gear pockets 72 are bores that extend from an end wall of drum housing 40 and which terminate with a radial end surface 80. Similarly, second gear pockets 76 are bores that extend from the end wall of drum housing 40 and which terminate with a radial end surface 82. When end cap 44 is installed on drum housing 40, its inner face surface 84 encloses the open ends of pockets 72 and 76. At least one, and preferably two, large window apertures (not shown) are formed in drum housing 40. The window apertures communicates with chamber 42 and portions of gear pockets 72 and 76 to permit access for installation of side gears 62 and 64 and C-clips 66.

First pinions 70 are shown to include a long, larger diameter gear segment 70a and a short, smaller diameter stub shaft segment 70b. When installed in first gear pockets 72, first pinions 70 are arranged such that the teeth of gear segments 70a are meshed with the teeth of side gear 62 while their outer diameter tooth end surfaces are journally supported by the bearing wall surface of pockets 72.

Likewise, second pinions 74 are shown to include a long, larger diameter gear segment 74a and a short smaller diameter stub shaft 74b. When installed in second gear pockets 76, second pinions 74 are arranged such that the teeth of gear segments 74a are meshed with the teeth of side gear 64 while their outer diameter tooth end surfaces are journally supported by the bearing wall surface of second gear pockets 76. Since pinions 70 and 74 are arranged in meshed sets, gear segment 70a of one of first pinions 70 also meshes with gear segment 74a of a corresponding one of second pinions 74. Preferably, gear segments 70a and 74a are of an axial length to effectively maintain meshed engagement substantially along their entire length.

According to the present invention, planetary gearset 30 is equipped with an anti-tipping mechanism which functions to support stub shaft segments 70b on each of first pinions 70 against the bearing wall surface of its corresponding first gear pocket 72 and against the outer diameter tooth end surfaces of side gear 64 and gear segment 74a of its meshed second pinion 74. The anti-tipping mechanism is similarly employed to support stub shaft segment 74b on each of second pinions 74 against the bearing wall surface of its corresponding second gear pocket 76 and against the outer diameter tooth end surfaces of side gear 62 and gear segment 70a of its meshed first pinion 70. By supporting shaft segments 70b and 74b in this manner, pinions 70 and 74 are supported substantially along their entire length in gear pockets 72 and 76, thereby substantially minimizing or preventing angular tipping of the pinions relative to their rotary axes.

The anti-tipping feature is provided by a set of support members, hereinafter referred to as brake shoes 90, that are mounted on pinion stub shaft segments 70b, 74b prior to installation of pinions 70, 74 into gear pockets 72,76. Alternatively, brake shoes 90 can be inserted into gear pockets 72, 76 prior to installation of pinions 70, 74 therein. Brake shoes 90 include an axial aperture 92 that is sized to journally support pinion shaft segments 70b and 74b while limiting radial deflection thereof. Each brake shoe 90 has a first support surface 94, a second support surface 96, and a third support surface 98. First support surface 94 is arcuate and is configured to rotationally support the outer diameter tooth end surface of the corresponding one of side gears 62 and 64. Second support surface 96 is arcuate and is configured to rotationally support the outer diameter tooth end surface of corresponding pinion gear segment 70a, 74a. Finally, third support surface 98 is arcuate and is configured such that it is supported by the complimentary bearing wall surface of the corresponding gear pocket 72, 76. Thus, any radial movement of side gears 62, 64 and/or pinion gear segments 70a, 74a relative to brake shoes 90 will result in frictional engagement therebetween which generates a braking force for limiting speed differentiation therebetween. This braking feature also results in increased torque bias for differential 10. Brake shoes 90 have an axial length selected to support stub shafts 70b, 74b substantially along their entire length while permitting limited axial sliding movement of brake shoes 90 in gear pockets 70, 72 relative to the pinions. Under normal circumstances, this lateral clearance prevents binding of the pinions. However, axial movement of the pinions due to thrust loads will cause frictional engagement between face surfaces 100 and 102 of brake shoes 90 and adjacent pinion end surfaces 70c and 74c, thereby increasing the torque bias ratio of differential 10.

Figure 6:
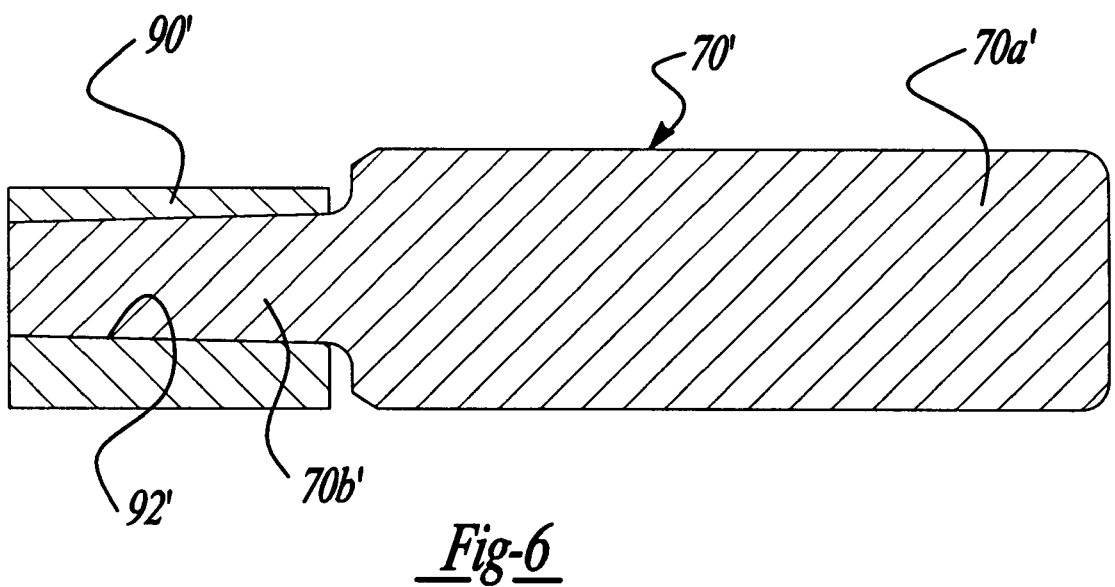
FIG. 6 is a partial sectional view showing an alternative interface between the pinion and the brake shoe.

With particular reference now to FIG. 6, a modified construction of the interface between the pinion stub shaft segment and the brake shoe are shown. Specifically, pinion stub shaft 70b' of pinion 70' is shown to be frusto-conically tapered in contrast to the right cylindrical stub shaft 70b of pinion 70 previously disclosed. Pinion stub shaft 70b' is tapered with a larger diameter proximate to gear segment 70a and a small diameter at its distal end. Likewise, aperture 92' in brake shoe 90' is frusto-conically tapered to mate with tapered pinion stub shaft 70b'.

With such a tapered socket-type arrangement, axial movement of pinion 70' toward brake shoe 90' causes frictional engagement between tapered pinion stub shaft 70b' and the tapered wall surface of brake shoe aperture 92'. Since brake shoe 90' is prevented from rotating due to its first and second support surfaces 94 and 96 respectively mating with side gear 64 and gear segment 74a, such frictional engagement functions to brake rotation of pinion 70'. Thus, FIG. 6 illustrates integration of a clutch cone between the pinion shaft and the brake shoe for providing additional resistance to differentiation in response to axial travel of the pinion relative to the brake shoe. Obviously the modified brake shoe 90' could likewise be used with modified second pinions having a tapered stub shaft segment.

While the invention has been described in the specification and illustrated in the drawings with reference to different embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. A differential interconnecting a pair of shafts, comprising:

a housing rotatable about a common axis of the output shafts and defining an internal chamber, first and second pinion pockets communicating with said chamber, and openings for receiving end segments of the shafts extending into said chamber;

a first side gear rotatably supported in said chamber and adapted to be fixed for rotation with one of the shafts;

a second side gear rotatably supported in said chamber and adapted to be fixed for rotation with the other of the shafts;

a first pinion having a first gear segment and a first shaft segment, said first pinion is rotatably supported in said first pinion pocket such that said first gear segment is meshed with said first side gear;

a second pinion having a second gear segment and a second shaft segment, said second pinion is rotatably supported in said second pinion pocket such that said second gear segment is meshed with said second side gear and said first gear segment; and a brake shoe encircling said first shaft segment and having first, second and third support surfaces, said first support surface mating with an outer surface of said first side gear, said second support surface mating with an outer surface of said second gear segment, and said third support surface mating with a wall surface of said first pinion pocket.

2. The differential of claim 1 further comprising a brake shoe encircling said second shaft segment and having its first support surface mating with an outer surface of said second side gear, its second support surface mating with an outer surface of said first gear segment, and its third support surface mating with a wall surface of said second pinion pocket.

3. The differential of claim 1 wherein said housing includes a drum housing with said first and second pinion pockets extending longitudinally from an end surface, and an end cap mating with said end surface of said drum housing to enclose open ends of said first and second pinion pockets.

4. The differential of claim 1 wherein said first and second pinions have rotary axes aligned in parallel to the common axis of said housing and the shafts.

5. The differential of claim 1 further comprising additional paired sets of first and second pinion pockets formed circumferentially in said housing, and a corresponding number of first and second pinions installed in said additional paired sets of pinion pockets.

6. The differential of claim 1 wherein said first shaft segment of said first pinion is journalled in an aperture formed in said brake shoe.

7. The differential of claim 6 wherein said aperture is tapered and said first shaft segment is matingly tapered to define a cone clutch that is operable to generate a frictional braking force for limiting rotation of said first pinion relative to said brake shoe in response to relative axial movement therebetween.

8. A differential comprising:
  a housing having an interior chamber, first and second openings adapted for supporting end segments of first and second shafts for rotation about a common shaft axis, at least two pinion bore sets each having a first pinion pocket extending along an axis that is parallel to said shaft axis and a second pinion pocket overlapping said first pinion pocket and extending along an axis that is parallel to said shaft axis and said first pinion pocket axis;
  a gearset having first and second side gears rotatably supported in said interior chamber that are adapted to be fixed for rotation with the first and second shafts, and at least two meshed pinion sets each having a first pinion mounted in one of said first pinion pockets that is meshed with said first side gear, and a second pinion mounted in one of said second pinion pockets that is meshed with said second side gear; and
  brake shoes axially aligned with said first pinions and having an aperture journally supporting a shaft segment of said first pinion, a first support surface mating with an outer surface of said first side gear, a second support surface mating with an outer surface of a corresponding second pinion of said meshed pinion set, and a third support surface mating with an inner wall surface of said first pinion pocket.

9. The differential of claim 8 wherein said aperture is tapered and said first shaft segment is matingly tapered to define a cone clutch that is operable to generate a frictional braking force for limiting rotation of said first pinion relative to said brake shoe in response to relative axial movement therebetween.

10. The differential of claim 8 wherein said housing includes a drum housing with said first and second pinion pockets extending longitudinally from an end surface, and an end cap mating with said end surface of said drum housing to enclose open ends of said first and second pinion pockets.

11. The differential of claim 8 further comprising additional brake shoes aligned with said second pinions and having said apertures journally supporting a shaft segment of said second pinions, and wherein said first support surface of said brake shoe mates with an outer surface of said second side gear, said second support surface of said brake shoes mates with an outer surface of a corresponding first pinion, and said third support surface of said brake shoe mates with an inner wall surface of said second pinion pocket.

12. A differential comprising:
  a differential housing defining an internal chamber, a first axle opening extending from said chamber through a first end wall of said housing, a second axle opening extending from said chamber through a second end wall of said housing, at least two pinion bore sets each having first and second overlapping pinion pockets extending across said chamber, a first socket disposed between said first axle opening and said chamber, and a second socket disposed between said second axle opening and said chamber;
  a first side gear positioned within said chamber and seated in said first socket;
  a second side gear positioned within said chamber and seated in said second socket;
  at least two meshed pinion sets each having a first pinion disposed within one of said first pinion pockets and meshed with said first side gear and a second pinion disposed within a corresponding one of said second pinion pockets and meshed with said second side gear and said first pinion gear; and
  brake shoes axially aligned with said first pinions and having an aperture journally supporting an integral shaft segment at one end of said first pinion, said brake shoes further including a first support surface mating with an outer surface of said first side gear, a second support surface mating with an outer surface of a corresponding second pinion of said meshed pinion set, and a third support surface mating with an inner wall surface of said first pinion pocket.

13. The differential of claim 12 wherein said aperture is tapered and said first shaft segment is tapered to define a cone clutch that is operable to generate a frictional braking force for limiting rotation of said first pinion relative to said brake shoe in response to relative axial movement therebetween.

14. The differential of claim 12 wherein said housing includes a drum housing with said first and second pinion pockets extending longitudinally from an end surface, and an end cap mating with said end surface of said drum housing to enclose open ends of said first and second pinion pockets.

15. A differential comprising:
  a housing having an interior chamber and first and second openings adapted for supporting end segments of first and second shafts for rotation about a common shaft axis, said housing also having at least two pinion bore sets with each set including a first pinion pocket extending along an axis that is parallel to said shaft axis and a second pinion pocket overlapping said first pinion pocket and extending along an axis that is parallel to said shaft axis and said first pinion pocket axis;
  a gearset having first and second side gears rotatably supported in said interior chamber that are adapted to be fixed for rotation with the first and second shafts, and at least two meshed pinion sets each having a first pinion mounted in one of said first pinion pockets that is meshed with said first side gear, and a second pinion mounted in one of said second pinion pockets that is meshed with said second side gear;
  A first set of brake shoes axially aligned with said first pinions and each having an aperture journally supporting a shaft segment of said first pinion, a first support surface mating with an outer surface of said first side gear, a second support surface mating with an outer surface of a corresponding second pinion of said meshed pinion set, and a third support surface mating with an inner wall surface of said first pinion pocket; and
  a second set of brake shoes axially aligned with said second pinions and each having its aperture journally supporting a shaft segment of said second pinion, its first support surface mating with an outer surface of said second side gear, its second support surface mating with an outer surface of a corresponding first pinion of said meshed pinion set, and its third support surface mating with an inner wall surface of said second pinion pocket.

* * * * *